Patented Apr. 18, 1944

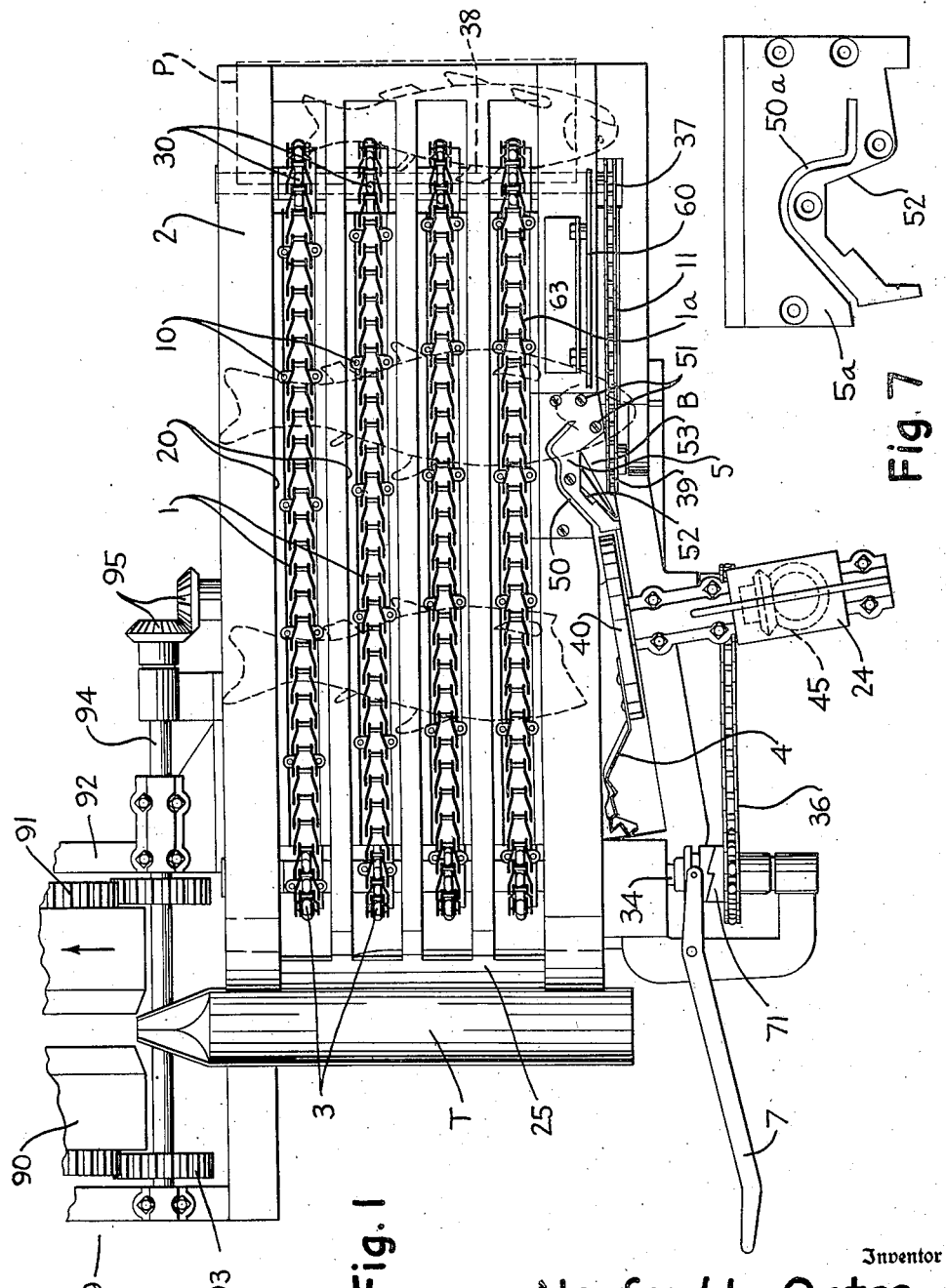
April 18, 1944.  N. L. OATES  2,346,935
FEEDER TABLE FOR FISH DRESSING MACHINES
Filed April 15, 1940  3 Sheets-Sheet 1
Inventor
Norford L. Oates
By Reynolds & Beach
Attorneys April 18, 1944.  N. L. OATES  2,346,935
FEEDER TABLE FOR FISH DRESSING MACHINES
Filed April 15, 1940  3 Sheets-Sheet 2
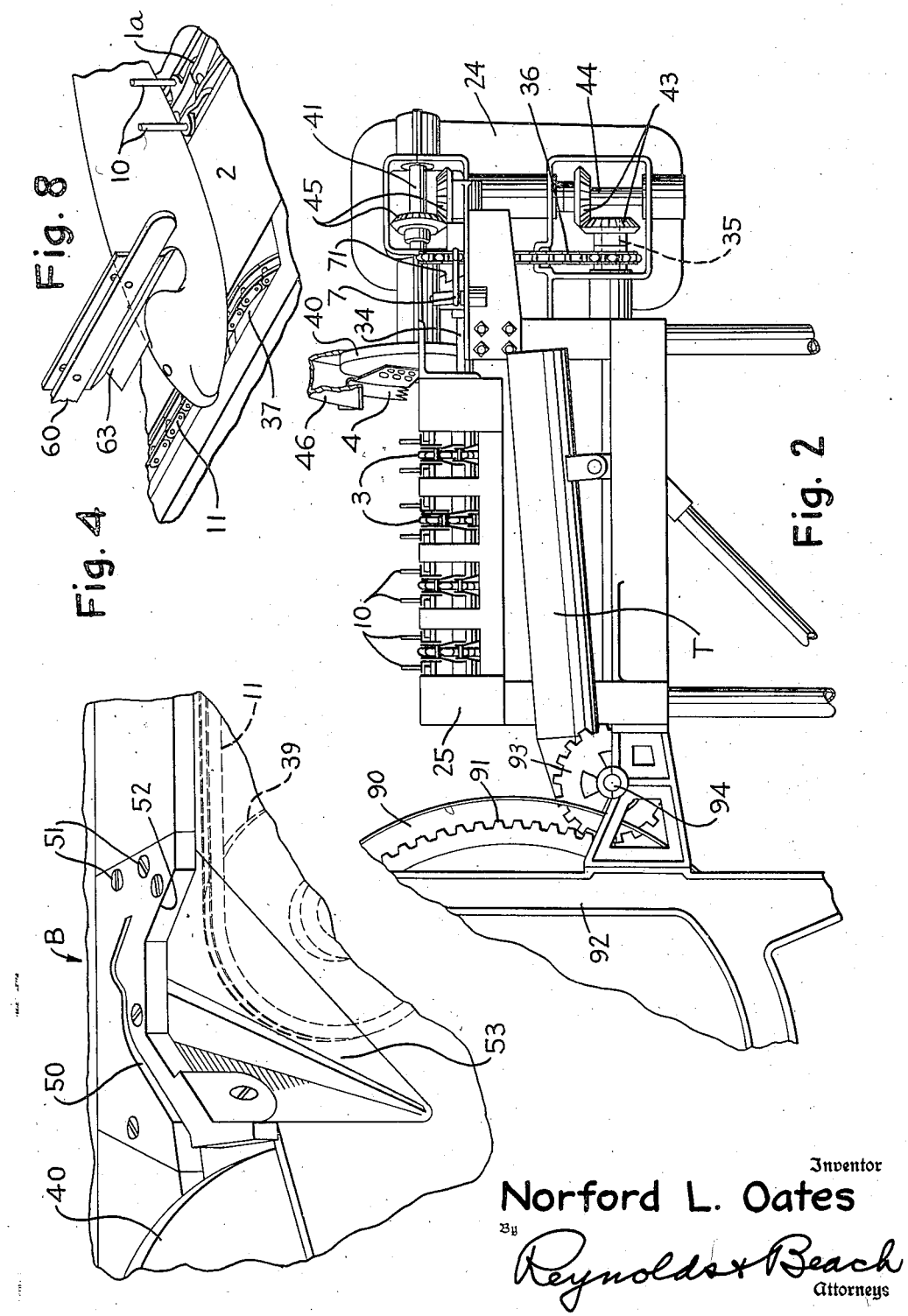
Inventor
Norford L. Oates
By
Reynolds + Beach
Attorneys

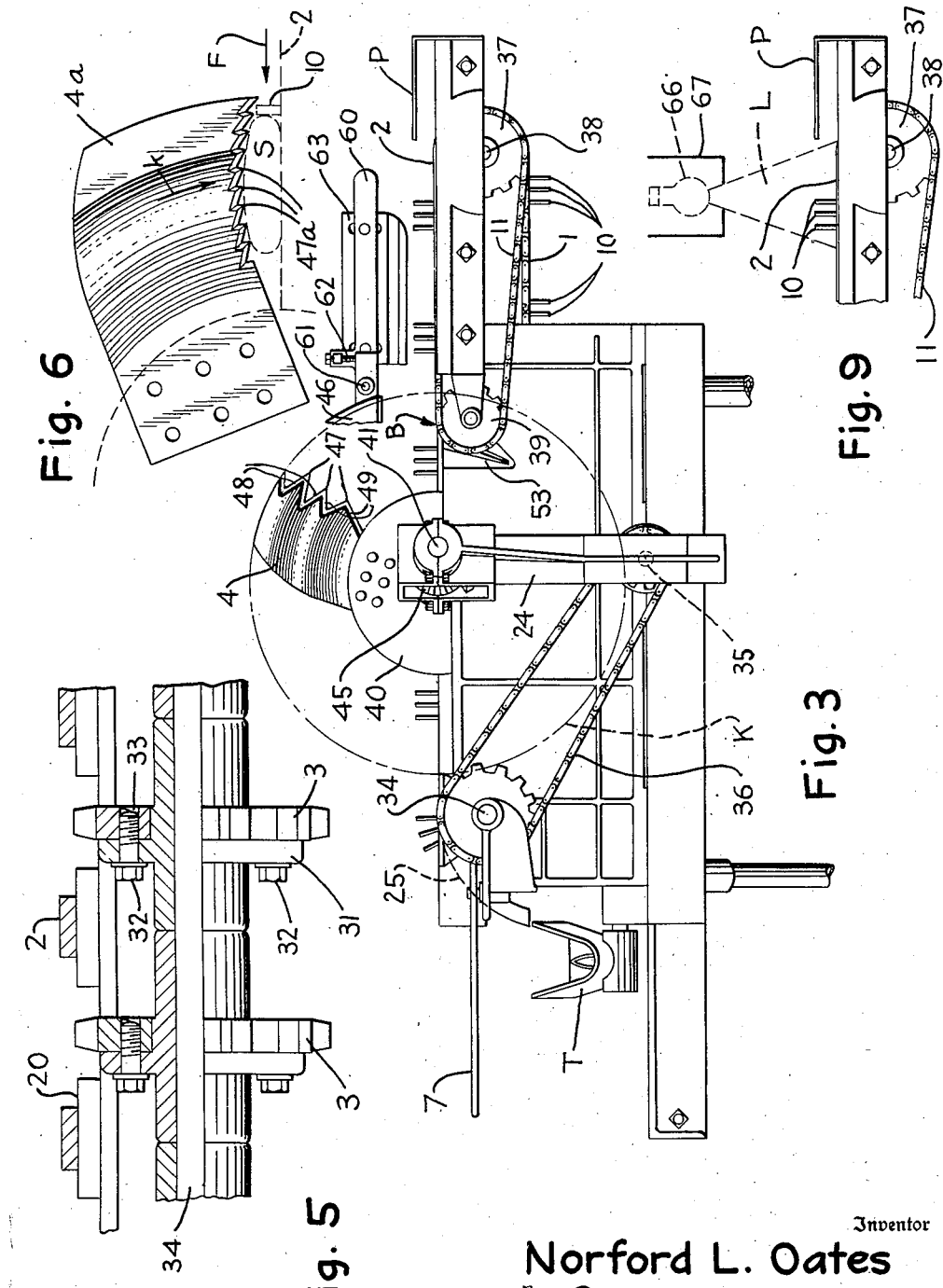

2,346,935

UNITED STATES PATENT OFFICE 2,346,935

FEEDER TABLE FOR FISH DRESSING MACHINES

Norford L. Oates, Seattle, Wash., assignor to Smith Cannery Machines Company, Seattle, Wash., a corporation of Washington Application April 15, 1940, Serial No. 329,714

19 Claims. (Cl. 17—4)

Most salmon are prepared for packing upon fish dressing machines of a well-known type, and are fed into the fish dressing machine from feeder tables, where they are beheaded. Such a table and its relationship to the fish dressing machine are shown, for example, in each of the patents to E. H. Waugh, Nos. 1,542,196, June 16, 1925, and 1,909,643, May 16, 1933, which patents are owned by the assignee of this application. The present invention, in effect, is an improvement upon the feeder table and the beheading means as shown in those Waugh patents.

The earlier Waugh patent is advantageous in that it has a flat bed along which the fish are advanced, belly-rearward and lying flat, past a beheading knife, and are finally tilted or rotated through ninety degrees into a trough, for delivery to the fish dressing machine. It has certain disadvantages, arising chiefly from the nature and relationship of the knife to the remainder of the table. The knife in that arrangement, for reasons not necessary to set forth in detail, but considered compelling, was merely oscillatory between a position upraised above the bed and a position just below the bed. During its downstroke of perhaps a foot the knife had to acquire sufficient momentum to penetrate and sever the head of a salmon weighing perhaps twenty pounds, or even more, including severance of firm back flesh, backbone, gill and gill bone or pectoral girdle (if the positioning was inaccurate), and flabby flesh at the salmon's throat. This imposed a severe strain on the mechanism. Because the knife had to reverse and start from zero at the top of its stroke, to gather momentum, it was considered necessary to speed up the advance of the knife and to slow down the advance of the fish during the beheading operation, and elliptical gears were employed for the purpose. While the necessity of accurate timing of the fish's arrival at and registry with the beheading point were understood, the means to secure such results comprised only a pin or web piercing the fish in the vicinity of its gill during its advance; to avoid contact of the knife with the pin and with the chain carrying it, the chain stopped short of the beheading point, and the pin was withdrawn before the fish reached the beheading point. The impositive belt feed for the body of the fish was relied upon to carry the fish on to the beheading point without loss of registry, but this did not always result. As a result, portions of the gill and of the gill bone behind the gill were sometimes severed by the knife, further burdening it, and leaving undesirable bony structure attached to the fish.

For such reasons the feeder table of the earlier Waugh patent was not widely used, and it was superseded by the table of the later patent, which was a modification of a still earlier type, shown in the Smith Patent No. 1,034,525, August 6, 1912. The later Waugh patent is characterized by the positive advance of the fish throughout, though by two separate means, first by chains with lugs, then by rotative lifter arms; by the provision of a knife fixed in the path of the fish, as it is lifted and moved in an arcuate path by the lifter arms; by the provision of a hump supporting the fish as it is moved by the lifter arms, and shaped so that the hump finally assumes the fish's support from the lifter arms, as the latters' path drops within the hump; and by the necessity, with the usual and convenient heights employed for the table and at the feed end of the fish dressing machine, for dropping the beheaded fish through a substantial distance from the top of the hump into the trough, virtually under no control. The result of so dropping the fish was that many fish rotated improperly, and were incorrectly presented to the fish dressing machine, so that it was necessary for an attendant at that point to devote his attention primarily to positioning the fish properly in the trough. This last-described type of feeder table eliminated any problem of proper timing, for the knife was stationary, but it was still necessary for each fish to acquire very appreciable momentum within a short time, as it was raised from the table and past the knife. The lifter arms had to be made quite strongly, to this end, and the momentum given the fish rendered it unmanageable.

The patent to Brierly and Waugh, No. 1,222,926, April 17, 1917, suggested various other forms, among them one wherein the fish were impaled at the gill only, for insuring positive, timed advance, and was advanced along a table past a rotative knife, the axis whereof was normal to the path of the fish. The entire reliance for positioning the fish was placed upon the single pin, around which the fish might still rotate, and since the knife engaged and beheaded the fish on its downstroke, its parallel upstroke likewise engaged the fish, and prevented proper delivery to the trough and to the fish dressing machine.

It is an object of the present invention to provide a feeder table and a beheading means which will eliminate the difficulties and drawbacks of the previous forms discussed above, and which will simplify the table and effect a better job of beheading and of feeding to the fish dressing machine.

More specifically it is an object to provide a table which will be simple in that it employs a flat bed and a positive chain drive the entire length of the table, along which the fish can be carried flatwise and without any change of attitude until after they are beheaded, and until they are rotated 90° as they are dropped into the trough; which employs a rotary beheading knife, taking advantage of the dynamic inertia that may be acquired by such rotary movement, even with lightly-constructed parts, yet which knife does not interfere with any part of the table or other mechanism by reason of its position relationship to the direction of feed of the fish and to the table generally; which table is simplified and improved in that the fish has but a slight drop into the trough, and therefore is unlikely to be dropped or slid into the trough in any but the proper attitude.

It is an object of the present invention to simplify and improve the feeder table and the beheading means in these and in other respects, as will appear hereafter.

The invention is adaptable to knives for making either the straight cut or the gill cut, as may be preferred, and it is an object of the invention to provide mechanism of this sort which is easily changed over from one form of cut to the other as the operator may prefer.

Part of the advantages of the invention are achieved by reason of an improved form of knife, and it is a further object of the invention to provide as a new article of manufacture a knife so shaped as to attain these advantages, and more particularly to do so by pinning or penetrating the fish simultaneously at several points along the line of the intended cut prior to any appreciable slicing or severing action, and so that the fish, thus located, may have its head severed, notwithstanding the relative advance towards the knife of the fish and the movement of the knife past the fish as it is advancing. Likewise, with respect to the formation of the knife, it is an object to slope the cutting edges of the knife's serrations in such a direction that they assist in advancing the fish (which continues its positive advance even during the beheading operation), rather than opposing such advance, with possible distortion of the line or location of the cut.

It is a further object to provide feed means preferably, but in any event supporting means, for the head, so that the fish is supported at both sides of the line of severance to make the severance clean and complete, notwithstanding the continued advance of the fish toward the knife during the beheading operation.

With these and other objects in mind, as will appear hereafter, my invention comprises the novel parts, including the novel article of manufacture mentioned above, and the novel combination and arrangement of such parts in a new cooperative relationship, all as shown in the accompanying drawings and as will be more particularly described in this specification and pointed out and defined by the claims which terminate the same.

In the accompanying drawings I have shown my invention embodied in a form which is now preferred by me, and certain alternative forms have likewise been illustrated.

Figure 1 is a plan view of the feeder table, illustrating also portions of the fish dressing machine, certain guards and the like being omitted for clearer illustration.

Figure 2 is an end elevation of the same.

Figure 3 is a side elevation of the feeder table.

Figure 4 is a perspective view of the region of the table in the vicinity of the beheading knife, and of the fish head's support during the beheading operation.

Figure 5 is in part an elevation and in part a section axially along the drive shaft for the feeder table.

Figure 6 is an elevation of a modified form of beheader knife.

Figure 7 is a plan view of a modified form of support for the fish head, illustrating the supporting plate employed when making the gill cut, as distinguished from the so-called straight cut.

Figure 8 is a perspective view of the fish-positioning or contact gauge means, and associated elements.

Figure 9 is a detail elevation of a modified fish-positioning or light beam gauge means.

The fish dressing machine is generally indicated at 9, and includes a bull ring 90 rotated in the direction of the arrow (Figure 1) by gears 91 in a frame 92, driven by meshing pinions 93 on a shaft 94. Power for driving the feed means may be taken off through a pair of bevel gears 95. The fish are supplied to the feed table from a feed platform P, and are slid down a curved surface 25 at the opposite end of the feed table to a trough T which is inclined to deliver beheaded fish, tail end first, to the bull ring 90 for proper cooperation with the fish dressing elements of the machine 9, which elements are not shown. The fish must be delivered in the trough T tail end first and belly up, and the feed table must be so arranged that the fish are automatically delivered in this position into the trough with as little necessity as possible for the intervention of a workman at the trough, regardless of the variation in size of the fish. Such fish are treated in these fish dressing machines from a size of perhaps two or three pounds as a minimum up to 20 or even 25 pounds, and the feeder table must be capable, to the greatest degree possible, of receiving, advancing, beheading, and delivering these fish, with substantially no attention except delivering them from the platform P upon the feeder table itself, and positioning them properly upon the table.

The feeder table includes a flat bed 2 having longitudinal grooves 20 within which are received the upper runs of endless feed chains 1, which at spaced intervals are provided with upstanding pins or lugs 10. The chains pass over sprocket wheels 3 and 30 at the opposite ends of the table. The lugs 10 are arranged in a suitable pattern transversely of the table, such that the lugs will suitably engage and position a fish at intervals in its length, when it is laid transversely upon the table, and will present the fish in proper position to the beheading knife 4 at the beheading point B. Since it may be desirable to alter the pattern of the rows of lugs 10, provision is made for limited arcuate adjustment of the pairs of sprocket wheels, each about its axis. Each such sprocket wheel, as seen in Figure 5, is provided with a hole 33 receiving a bolt 32, which is received within an arcuate slot in a hub 31, the latter of which is secured upon a shaft that supports the sprocket wheels. The sprocket wheels 3 are carried upon a shaft 34 (see Figure 3) which is driven from the shaft 35, which at one end receives one of the bevel gears 95 shown in Figure 1, the connection between the shafts 34 and 35 being by the sprocket chain 36 and suitable drive sprocket wheels on the respective shafts.

In addition to the chains I there is also provided a chain II extending between a sprocket wheel 37 upon the shaft 38 and a sprocket wheel 39 which is supported, independently of other sprocket wheels, from the bed 2 in the vicinity of the beheading point B. This chain II is provided for the support of the fish's head, which in certain kinds of salmon is quite a large proportion of the total length. It will be particularly noted as the description progresses that the head chain II extends to or beyond the beheading point, and that the beheading knife engages the fish while its head is supported by one chain and its body by other chains, the knife striking between the head chain II and the first body chain Ia. In this manner the head is properly supported and advanced along with the remainder of the fish, and is given adequate support, even though it overhangs considerably, during the beheading operation, and there is no possibility of the head lagging behind the body in the final advance to the beheading point, and consequent maladjustment of the fish relative to the path of the beheading knife.

The beheading knife 4 is secured upon a hub 40 which affords somewhat of a flywheel effect, this hub being carried upon a shaft 41 journaled in a bracket 24 supported at the side of the bed or frame 2. In distinction to previous beheading knives the shaft 41 in this machine is canted or inclined, as viewed in plan, so that its axis does not extend at right angles to the direction of advance of the fish, but is inclined with respect thereto. Preferably the axis of the shaft 41 lies closely adjacent or in the top plane surface of the bed 2 whereupon the fish rests. It is shown as positioned parallel to the plane of this bed, though this is not an essential relationship, for it might be tilted somewhat from the horizontal. In any event, the shaft lies closely adjacent the top surface of the bed 2, and as noted above, is inclined, as seen in plan, with respect to the direction of advance of the fish, represented by the grooves 20 and chains I and II.

The knife is rotated by any suitable drive means, as for example by the pair of bevel gears 43, one of which is carried upon the shaft 25 and the other of which is carried upon the vertical shaft 44, supported for rotation in the bracket 24, the drive to the shaft 41 in turn being by way of bevel gears 45 (see Figure 2).

By these or similar means the shaft 41 may be placed at such angle to the shaft 35 as will permit the rotary path of the knife 4 to intersect the path of advance of the fish at the beheading point B within the margin of the table 2, and between the chain II and the chain Ia, yet the upstroke of the knife 4, 180° from the beheading point, may be outside the margin of the table 2, and is definitely spaced outwardly of the path of the beheaded fish, as is best seen in Figure 1, and hence the knife cannot in any respect interfere with any part of the feed table or its drive or control means, nor with the beheaded fish on its way from the beheading point B to the trough T. The rotary path of the knife is best shown in Figure 1 and by the circle K in Figure 3.

At the beheading point B, where the knife in its downstroke intersects the surface of the bed 2 and passes inside the margin of the bed, the bed is suitably contoured or slit conformably to the shape of the knife to permit the knife to pass through but to support the fish adequately and firmly at each side of the knife and close to the path thereof, so that a substantially true shearing action is accomplished, and the fish adequately resists the force of the knife stroke, and is clearly severed at the proper point. Since most operators prefer what is termed the straight cut, which severs the fish back of the gills and which also severs the pectoral fins, the slit in the table is normally of the shape of the straight-cut knife, which is shown in Figure 1, but because some operators prefer the gill cut, which hugs closer to the line of the gill and the pectoral girdle, avoiding cutting out the pectoral fins, it is preferred that the table itself be recessed at the beheading point, and that its surface be completed by a flush plate 5 having a slit 50 for the passage of the knife, the plate being secured removably by screws 51. It is possible, then, to substitute for the plate 5, shown as formed with the straight-cut slit, a plate 5a (see Figure 7) having the slit 50a formed for cooperation with a gill-cutting knife. Each of these plates is recessed, as shown at 52, outwardly of the slit 50 or 50a, and the commencement of a chute 53 is provided for the reception and guidance of the severed head. Such matters are shown in somewhat greater detail in the perspective view, Figure 4. A guard 46 is normally applied surrounding the path of the knife, and supported from the table and from the bracket 24, but this guard has been largely omitted for clearer illustration.

By reference to Figure 3 it will be seen that the knife 4 has its advancing or cutting edge serrated to provide a series of points 47, most of which, if not all of them, define a contour or profile that closely coincides with the curvature of an average fish, laid flatwise, at the beheading point, just back of the gill. Such knife is inclined toward the table from hub 40, so that the general cutting edge profile will be substantially parallel to the upper side of the fish at the moment of engagement therewith even though the axis of shaft 41 lies below the upper side of the fish. The reason for this is to provide a series of points which are part of the knife itself, and part of the knife's cutting edge, which will enter the fish and pin the throat in position at the inception of the beheading operation. The knife travels with sufficient rapidity and with sufficient momentum that it cuts through the fish in a brief interval of time, yet the fish is advancing to the left as seen in Figures 1 and 3 during the time the knife is swinging downward toward and past it, and in order that the cut may be accurate and clean it is preferred that the fish be pinned simultaneously at several points across the line of the beheading cut, so that it may not be displaced from proper registry with the beheading knife. After the points 47 have penetrated the fish the immediately following, indeed continuous, movement of the knife effects severance of the head by the sharp edges 48 and 49, and the head, supported by the plate 5 or 5a and by the chain II, immediately loses the support of the chain and drops into the chute 53. The edges 48 face in the direction from which the fish is advancing, and serve to slice more or less vertically, while the edges 49, which face away from the direction from which the fish is advancing, slice across the fish in effect, and complete the severance. While so doing, these edges 49, by the direction of their slope, tend to draw the fish along the table in the direction of its advance. Thus they assist, rather than obstruct, the advance, and avoid distortion of the fish.

It may be preferred to pin the fish at more than just a few points, and to this end an alternative form of knife is illustrated in Figure 6, in engagement with a fish S which has just reached the beheading point. The points 47a are here more numerous, but still their profile coincides generally with the upper surface of the fish S. The knife 4a in this instance is rotating and moving downwardly in the general direction indicated by the arrow k, and the fish is advancing in the direction shown by the arrow F. Again it will be observed that there are vertical edges to the various points that effect penetration of the fish, and slicing edges, faced somewhat away from the direction of the fish's advance, to complete the severance of the head, and to draw the fish along.

It is believed the operation of the feeder table and the manner of its cooperation with the fish dressing machine will be apparent. Fish delivered at the platform P are fed by hand upon the feeder table 2. They come in random lengths and sizes, and the operator at this point has only to see that each head is pointed in the proper direction, and that each fish is laid flat transversely of the table and belly to the rear, with respect to the direction of advance. The lugs 10 insure that the angle of the fish transversely of the table, and the spacing of successive fish, are correct. The operator must also see that each fish is accurately positioned transversely of the table, that is, that the gill is properly disposed so that no more of the fish is cut off than is necessary, and so that all that should be cut off is cut off, when the fish reaches the beheading point.

To assist the operator at this point in properly positioning the fish, transversely of the table and with respect to the beheading point, an arm 60, pivoted at 61 upon the guard, and held upraised by an adjusting screw 62, may in itself serve as a visual indicator or gauge, but preferably carries a positive stop 63. The bar 63 may be supported for vertical adjustment relative to arm 60 by two bolts extending through slots spaced lengthwise along the arm, as shown in Figure 3. The fish locating member 63 resembles a letter V, turned sidewise, and is located where it will engage and slide under the fish's uppermost gill cover, as the fish advances beneath it. The operator then merely pushes the fish transversely of the table until the interlocked stop 63 and gill prevent further movement, and knows that the fish is properly located. The fish is slid past the stop 63 by its advance along the table, before it reaches the beheading point. The arm 60 is adjustable transversely of the table, to whatever extent is necessary.

As a substitute positioning means, as shown in Figure 9, there is supported overhead a light source 66 supported within an enclosure or shield 67 to project a narrow beam of light L downwardly upon the fish as it is first laid upon the bed 2. This beam of light L is properly located with respect to the slit 50 or 50a, being adjustably mounted if necessary, and while it is intangible it serves as an accurate gauge to indicate upon the fish where the cut will occur. If the fish continue to be improperly located the operator shifts it one way or the other.

A second operator attends chiefly to the fish in its progress through the fish dressing machine 9, but he can also attend to the occasional maladjusted fish at the trough T. It will be noted in Figure 3, and has been remarked above, that the delivery end of the table 2 curves downwardly by a smooth curve 25 merging with the trough T. The depth of the trough below the level of the bed 2 is not great, nor greatly more than the width from back to belly of a good sized fish. As a result, with the smooth curve 25 and with the lugs advancing the fish down this curve at least part way the back of the fish has reached or entered the trough T before the belly of the fish is disengaged by the lugs 10 as they disappear beneath the curved surface 25. Before the fish has a chance to fall to any great distance or to rotate unduly it is received and contained by the walls of the trough, and the chance that it will lie askew in the trough is very slight.

The operator at the delivery end of the feed table may straighten out any fish which do become askew in the trough, and in case it becomes necessary to stop the feed table there is located conveniently to such an operator a clutch handle 7 controlling a jaw clutch 71 interposed between the shaft 34 and the sprocket wheel which is driven by the chain 36 and which provides the main drive for the chains 1 and 11, and for the knife 4. The clutch 71 is of such shape that upon reengagement the proper timing relationship through the several chains and drive means, between the knife 4 and the chains 1, is automatically obtained.

What I claim as my invention is:

1. A feed table for fish dressing machines, comprising a bed, means to advance fish positively, and in spaced relation, along the bed, to and past a beheading point, a knife rotatable about an axis which is inclined relative to the direction of advance of the fish, and through a path which includes the beheading point, and means timed with the fish-advancing means thus to rotate the knife towards and past the fish, as each of the latter arrives at the beheading point, the knife's advancing edge being serrated, and the profile of the points thereof being curved correspondingly to the shape of the individual fish, to penetrate the individual fish substantially simultaneously at all points along the edge.

2. A feed table for a fish dressing machine, comprising a bed extending from a feed point, past a beheading point, to a delivery point, parallel endless conveyor chains or the like extending lengthwise of the bed, certain thereof supporting and advancing the fish's body, and extending beyond the beheading point, and another supporting and advancing the fish's head, and extending at least to the beheading point, and a beheading knife movable downwardly to and past the bed, at the beheading point, between the head-supporting chain and the adjacent body-supporting chain.

3. A feed table as in claim 2, wherein the knife is rotatable continuously in one direction, about an axis generally parallel to the plane of the table, but inclined relative to the run of the chains, the several parts being so organized and arranged that the upstroke of the knife lies generally in the line, extended, of the head-supporting chain.

4. A feed table for a fish dressing machine, comprising a flat bed for supporting fish laid flat thereon, means to advance such fish individually along said bed at a substantially constant rate and transversely of their length, a knife movable in a path which intersects the fish's path, the knife being so guided that at the point of such intersection it is moving towards the fish and substantially at right angles to the fish's direction of advance, and means operatively connecting the knife and the advancing means, to time the arrival of the fish at the intersection of the paths during the beheading downstroke of the knife, the knife edge having a plurality of serrations, the advancing points whereof penetrate and fix each of the fish momentarily, and joining edges which, by the continued downstroke sever the head between the serrated points, notwithstanding the slight displacement of the fish by its feeding means, relative to the knife's path.

5. A feed table for a fish dressing machine, comprising a flat bed having spaced longitudinal grooves, feed chains received in said grooves, sprocket wheels supported beneath the table, adjacent its ends, to support and drive the chains at a constant rate of advance, lugs upstanding from the several chains, at intervals, and arranged in a transverse pattern to engage a fish lying flat and transversely upon the bed, to advance it from the feed end to the delivery end, a head chain similarly supported and driven, adjacent one side of the bed, extending from the feed end part-way to the delivery end, a knife movable in a path which intersects the bed beyond the sprocket wheel at an end of the head chain, but in a line between the head chain and the adjacent chain, means guiding the knife for movement substantially vertically downward at such point of intersection, the bed being slotted to conform closely to the shape of the knife and to support the fish at each side of the knife's path, and timing means interconnecting the knife and the chain drive.

6. As a new article of manufacture, a rotary fish beheading knife for use upon fish which are steadily advancing during the beheading operation, said knife having a plurality of serrations, the points whereof are joined by cutting edges, the profile of the points conforming generally to the shape of the neck of a fish, so that all points engage and penetrate the fish substantially simultaneously, and prior to appreciable severing action.

7. As a new article of manufacture, a rotary fish beheading knife for use upon fish which are steadily advancing during the beheading operation, said knife having a plurality of serrations, the points whereof are joined by cutting edges which face towards the oncoming fish and are disposed substantially at right angles to the direction of the fish's advance, and by cutting edges which slope from the points away from the oncoming fish, the profile of the points conforming generally to the shape of a fish at the neck, so that all points engage and penetrate the fish substantially simultaneously, prior to appreciable severing action, and so that severance and advance of each fish is accomplished jointly by continued advance of the fish towards the first-mentioned edges, and by the drawing action of the last-mentioned sloping edges.

8. In combination, a table along which fish are advanced to a beheading point, means to engage and so to advance the fish transversely of their length and laid flat upon the table, a knife at the beheading point movable downwardly relative to the table towards and past each of the fish, means synchronized with the fish-advancing means so to move the knife for engagement and beheading of a fish while it is at the beheading point, said knife having a plurality of fish-engaging serrations each with sharp edges inclined in relation to the relative movement of the knife past the fish, to pin the fish with the points of the serrations and to slice through the fish with such edges as the knife follows through.

9. A fish-beheading machine, comprising a bed whereon the fish are laid flat on their sides, means to advance the fish transversely of their length in definitely spaced relation along said bed to and past a beheading point, a sharp chopping knife supported for rotation about an axis generally parallel to the plane of the bed, and means timed with the fish-advancing means operable to rotate the knife only unidirectionally at a speed and through an angle between successive beheading operations sufficient to slice entirely through a fish in a single stroke as it arrives at the beheading point for effecting complete and clean-out severance of its head from its body and entrails.

10. A fish-beheading machine, comprising a bed whereon the fish are laid, means to advance the fish transversely of their length in definitely spaced relationship along said bed to and past a beheading point, a sharp chopping knife, means supporting said knife for movement downward in a path which intersects the bed at the beheading point and upward in a different path circumventing the beheading point, said bed being formed with a narrow slot at such point conformable to the shape of said chopping knife but spaced from both sides of said knife, to afford intimate support beneath both the body and head of each fish immediately along both sides of the beheading cut, and means timed with the fish-advancing means operable to move the knife at a speed to slice entirely through a fish in a single stroke as it arrives at the beheading point and to pass its cutting edge through such slot in said bed for effecting complete and clean-cut severance of the head of the fish from its body and entrails.

11. A fish-beheading machine, comprising a bed whereon the fish are laid flat on their sides, means to advance the fish transversely of their length in definitely spaced relationship along said bed to and past a beheading point, a sharp chopping knife disposed adjacent to one edge of the bed, means supporting said knife for rotation about an axis generally parallel to the plane of the bed and in a path which intersects such adjacent edge of the bed at the beheading point only, said bed being formed with a narrow slot at such point conformable to the shape of said chopping knife but spaced from both sides of said knife, to afford intimate support beneath both the body and head of each fish immediately along both sides of the beheading cut, and means timed with the fish-advancing means operable to rotate the knife only unidirectionally at a speed to slice entirely through a fish in a single stroke as it arrives at the beheading point and to pass through such slot in said bed for effecting complete and clean-cut severance of the head of the fish from its body and entrails.

12. A fish-beheading machine, comprising a bed whereon the fish are laid flat on their sides, means to advance the fish transversely of their length in definitely spaced relation along said bed to and past a beheading point, a member rotatable unidirectionally about an axis generally parallel to the plane of the bed, a sole sharp chopping knife carried by and rotatable with said member, and means operable to rotate said member at such a speed and in such phase relationship relative to said fish-advancing means that said knife is rotated through at least one complete revolution between successive beheading operations to slice entirely through each fish in a single stroke as it arrives at the beheading point for effecting complete and cleancut severance of its head from its body and entrails.

13. A feed table for fish-beheading machines, comprising a bed, whereon the fish are laid flat, means to advance fish transversely of their length in definitely spaced relation along said bed to and past a beheading point, a sharp chopping knife rotatable about an axis which is generally parallel to the plane of the bed, but inclined relative to the direction of advance of the fish, and through a path which includes the beheading point, and means timed with the fish-advancing means operable to rotate the knife at a speed and through an angle between successive beheading operations sufficient to slice entirely through a fish in a single stroke as it arrives at the beheading point for effecting complete and clean-cut severance of its head from its body and entrails.

14. A fish beheading machine, comprising a flat bed having spaced longitudinal grooves, feed chains received in said grooves, sprocket wheels supported beneath the table, adjacent its ends, to support and drive the chains, lugs upstanding from the several chains, at intervals, and arranged in a transverse pattern to engage a fish lying flat and transversely upon the bed and to advance it from one end to the other of the bed, a sharp chopping knife supported adjacent one edge of the bed for rotation about an axis which is generally parallel to and closely adjacent the plane of the bed, but which is inclined relative to the direction of the fish's advance, the parts being relatively so arranged and organized that the knife's path intersects the fish's path at one point only, between the ends of the fish's path and during a substantially vertical downstroke of the knife, and means timed with the chain drive operable to rotate the knife at a speed and through an angle between successive beheading operations sufficient to slice entirely through a fish in a single stroke as it arrives at the beheading point for effecting complete and clean-cut severance of its head from its body and entrails.

15. A fish-beheading machine comprising a bed whereon the fish are laid flat on their sides, means to advance the fish transversely of their length in definitely spaced relation along said bed to and past the beheading point, a member swingable about an axis generally parallel to the plane of the bed but located below the upper side of a fish lying on said bed at the beheading point, a knife carried by and swingable with said member having a sharp cutting edge whose mean contour is hooked downwardly toward the bed and shaped for engagement at the beheading point with the upper side of a fish in substantially parallel relationship thereto, and means timed with the fish-advancing means operable to rotate said member at a speed for driving said knife to slice entirely through a fish in a single stroke as it arrives at the beheading point for effecting complete and clean-cut severance of its head from its body and entrails.

16. A fish-beheading machine, comprising supporting means whereon the fish are supported, means to advance such fish transversely of their length in definitely spaced relation to and past a beheading point, a sharp chopping knife supported for rotation relative to said fish supporting means, and means timed with the fish advancing means operable to rotate the knife only unidirectionally at a speed sufficient to slice entirely through a fish in a single stroke as it arrives at the beheading point for effecting complete and clean-cut severance of its head from its body and entrails.

17. In a fish-beheading machine, a beheading knife having a plurality of points generally aligned to impale the side of a fish substantially simultaneously, and a sharp cutting edge joining adjacent points to slice through the portion of the fish intermediate the parts impaled by such adjacent points by continued relative movement of the fish and knife after the fish has been impaled by such points.

18. In a fish-beheading machine, a beheading knife having at least two points disposed to impale the side of a fish, and sharp, substantially linear cutting edges receding from the adjacent sides of said points and intersecting substantially at an angle to slice through the portion of the fish intermediate the parts impaled by such points by continued relative movement of the fish and knife after the fish has been impaled by the points.

19. A fish-beheading machine, comprising supporting means whereon the fish are laid, means to advance the fish in definitely spaced relationship along said supporting means to and past a beheading point, a sharp chopping knife, means supporting said knife for movement downward in a path which intersects the supporting means at the beheading point and upward in a different path circumventing the beheading point, and means timed with the fish-advancing means operable to move the knife at a speed to slice entirely through a fish in a single stroke as it arrives at the beheading point for effecting complete and clean-cut severance of the head of the fish from its body and entrails.

NORFORD L. OATES.